United States Patent
Itoyama et al.

(10) Patent No.: US 11,519,825 B2
(45) Date of Patent: Dec. 6, 2022

(54) TEMPERATURE ABNORMALITY DETECTION SYSTEM AND TEMPERATURE ABNORMALITY DETECTION METHOD

(71) Applicant: Central Japan Railway Company, Aichi (JP)

(72) Inventors: Masashi Itoyama, Aichi (JP); Takeshi Narita, Aichi (JP); Naotaka Kumagai, Aichi (JP)

(73) Assignee: Central Japan Railway Company, Aichi (JP)

( * ) Notice: Subject to any disclaimer, the term of this patent is extended or adjusted under 35 U.S.C. 154(b) by 771 days.

(21) Appl. No.: 16/534,273

(22) Filed: Aug. 7, 2019

(65) Prior Publication Data

US 2020/0049594 A1   Feb. 13, 2020

(30) Foreign Application Priority Data

Aug. 8, 2018   (JP) .............................. JP2018-149389

(51) Int. Cl.
  *G01M 17/08*   (2006.01)
  *G01M 17/10*   (2006.01)
  (Continued)

(52) U.S. Cl.
  CPC .............. *G01M 17/10* (2013.01); *B61K 9/04* (2013.01); *G01K 1/026* (2013.01)

(58) Field of Classification Search
  CPC . G01M 17/10; B61K 9/04; G01K 1/02; G01J 5/026; G01J 5/0022; G01J 2005/0077;
  (Continued)

(56) References Cited

U.S. PATENT DOCUMENTS

| | | | | |
|---|---|---|---|---|
| 368,488 A | * | 8/1887 | Patton | B60H 1/00 122/504 |
| 4,316,175 A | * | 2/1982 | Korber | G01K 3/00 340/682 |

(Continued)

FOREIGN PATENT DOCUMENTS

| | | | | |
|---|---|---|---|---|
| CA | 2685575 A | * | 6/2011 | |
| CH | 673189 | * | 2/1990 | |

(Continued)

OTHER PUBLICATIONS

Notice of Reasons for Rejection dated Jul. 5, 2022, in the corresponding Japanese patent application No. 2018/149389 and its English translation (manually prepared translation).

*Primary Examiner* — Gail Kaplan Verbitsky
(74) *Attorney, Agent, or Firm* — David D. Brush; Westman, Champlin & Koehler, P.A.

(57) ABSTRACT

A temperature abnormality detection system includes: measurement devices; and a processor to determine temperature abnormality using a first temperature T1, a second temperature T2, and a third temperature T3. The processor determines occurrence of temperature abnormality when any one of following conditions is satisfied:
  (A) T1>A0 or T2>A0 or T3>A0;
  (B) T1>A1 and (T2−T1>A4 or T2−T1<0) and T2>A2 and T3>A3;
  (C) T1>A1 and T2−T1>A4 and T3>A3;
  (D) T1>A1 and T2−T1>A4 and (T3−T2>A5 or T3−T1>A6); and
  (E) T1>A1 and T2−T1<0 and (T3−T2>A7 or T3−T1>A8),
where A1<A0, A2<A0, and A3<A0.

6 Claims, 5 Drawing Sheets

(51) Int. Cl.
*B61K 9/04* (2006.01)
*G01K 1/02* (2021.01)

(58) Field of Classification Search
CPC ... G01J 2005/0033; H04N 5/33; H04N 7/183; H04N 5/247; H04N 5/2355; H04N 5/23203; G01S 13/32; G01S 13/34; G01S 2013/9328; B61L 27/57; B61L 23/00; B61L 15/0027
See application file for complete search history.

(56) References Cited

U.S. PATENT DOCUMENTS

| | | | | |
|---|---|---|---|---|
| 4,323,211 | A | * | 4/1982 | Bambara .................. B61K 9/06 340/682 |
| 5,201,463 | A | * | 4/1993 | George ................ B65D 5/4204 229/203 |
| 5,677,533 | A | * | 10/1997 | Yaktine ................... B61K 9/04 250/342 |
| 6,012,396 | A | * | 1/2000 | Schulz ................... B61B 15/00 105/215.1 |
| 2006/0167659 | A1 | * | 7/2006 | Miyasaka ............... F16C 19/52 702/185 |
| 2010/0100275 | A1 | * | 4/2010 | Mian ................... G01M 17/013 382/284 |
| 2012/0193484 | A1 | * | 8/2012 | Furtwangler ............ B61K 9/04 246/169 A |
| 2013/0070083 | A1 | * | 3/2013 | Snead ................... B61L 23/045 348/125 |
| 2014/0169398 | A1 | * | 6/2014 | Arndt ...................... G01K 15/007 374/100 |
| 2016/0103083 | A1 | * | 4/2016 | Bartonek ............... G01J 5/0022 701/19 |
| 2017/0284868 | A1 | * | 10/2017 | Arndt ....................... G01J 5/025 |
| 2019/0265131 | A1 | * | 8/2019 | Worden ................. G07C 5/0808 |

FOREIGN PATENT DOCUMENTS

| | | | | |
|---|---|---|---|---|
| CN | 107314899 B | * | 12/2019 | .......... G01M 13/045 |
| GB | 2042842 A1 | * | 11/1991 | |
| GB | 2458104 A | * | 9/2009 | .......... F03B 13/1875 |
| JP | H0979915 A | | 3/1997 | |
| JP | 2000038133 A | * | 2/2000 | |
| JP | 2000146770 A | * | 5/2000 | |
| JP | 2000146770 A | | 5/2000 | |
| JP | 2016224042 A | | 12/2016 | |
| JP | 2017178114 A | * | 10/2017 | |
| JP | 2020023282 A | * | 2/2020 | ............... B61K 9/04 |
| KR | 20060004434 A | * | 1/2006 | |

* cited by examiner

TEMPERATURE ABNORMALITY DETECTION SYSTEM AND TEMPERATURE ABNORMALITY DETECTION METHOD

CROSS-REFERENCE TO RELATED APPLICATIONS

The present application claims the benefit of Japanese Patent Application No. 2018-149389 filed on Aug. 8, 2018 with the Japan Patent Office, the entire disclosure of which is incorporated herein by reference.

BACKGROUND

The present disclosure relates to a temperature abnormality detection system and a temperature abnormality detection method.

There is a known system for detecting temperature abnormality of an underfloor devices of a railroad vehicle (specifically, components of an axle system, such as gears and couplings attached to a railroad truck) (see Japanese Unexamined Patent Application Publication No. 2016-224042). By detecting temperature abnormality of the underfloor devices, abnormality of the railroad truck of the railroad vehicle can be indirectly detected during running.

SUMMARY

To determine temperature abnormality of an underfloor device, there is a method of determining occurrence of abnormality when the temperature exceeds a threshold value. In this method, detection of abnormality may be delayed if the threshold value is too high, and incorrect detection may occur frequently if the threshold value is too low.

Also, since the dispersion of the temperatures and temperature measurement accuracy for target devices may arise in a failure mode when abnormality occurs, abnormality determination based only on a measured temperature at a single point may result in an insufficient determination accuracy.

In one aspect of the present disclosure, it is preferable to provide a temperature abnormality detection system that allows detection of temperature abnormality of an underfloor device with high accuracy.

One embodiment of the present disclosure is a temperature abnormality detection system that comprises: measurement devices each configured to measure, at a corresponding one of points on a ground through which a railroad vehicle runs sequentially, a temperature of an underfloor device of the railroad vehicle that passes the corresponding point; and a processor configured to perform determination of temperature abnormality based on a first temperature $T1$, a second temperature $T2$ at a point which the railroad vehicle passes after a measurement point of the first temperature $T1$, and a third temperature $T3$ at a point which the railroad vehicle passes after a measurement point of the second temperature $T2$, among the temperatures measured by the measurement devices. The processor uses threshold values $A0$, $A1$, $A2$, $A3$, $A4$, $A5$, $A6$, $A7$, and $A8$, which are specified previously, and determines whether or not a temperature abnormality occurred when any one of following Conditions (A), (B), (C), (D), and (E) is satisfied:

(A) $(T1>A0)$ or $(T2>A0)$ or $(T3>A0)$;

(B) $(T1>A1)$ and $((T2-T1>A4)$ or $(T2-T1<0))$ and $(T2>A2)$ and $(T3>A3)$;

(C) $(T1>A1)$ and $(T2-T1>A4)$ and $(T3>A3)$;

(D) $(T1>A1)$ and $(T2-T1>A4)$ and $((T3-T2>A5)$ or $(T3-T1>A6))$; and (E) $(T1>A1)$ and $(T2-T1<0)$ and $((T3-T2>A7)$ or $(T3-T1>A8))$, where $A1<A0$, $A2<A0$, and $A3<A0$.

According to the aforementioned configuration, abnormality determination is performed using Conditions (B), (C), (D), and (E) in addition to using conventional Condition (A); thus, relatively rapid detection of temperature abnormality can be achieved while reducing incorrect detection. That is, temperature abnormality of an underfloor device can be detected with high accuracy.

According to Condition (B), by using the threshold values $A1$, $A2$, and $A3$, smaller than $A0$, which is an absolute threshold value of abnormality determination, occurrence of abnormality can be determined even when temperatures at any points do not exceed the absolute threshold value, but continue to be higher than a specified level.

According to Condition (C), occurrence of abnormality can be determined when a temperature higher than a specified level is observed at a first point, a temperature change from the first point to a second point exceeds a specified amount, and also a temperature higher than a specified level is observed at a third point.

According to Condition (D), occurrence of abnormality can be determined when a temperature higher than the specified level is observed at the first point, a temperature change from the first point to the second point exceeds a specified amount, and a temperature change from the second point to the third point or a temperature change from the first point to the third point exceeds a specified amount.

According to Condition (E), occurrence of abnormality can be determined when a temperature higher than the specified level is observed at the first point, the temperature decreases between the first point and the second point, and a temperature change from the second point to the third point or a temperature change from the first point to the third point exceeds a corresponding specified amount.

In one embodiment of the present disclosure, each of the first temperature $T1$, the second temperature $T2$, and the third temperature $T3$ may be a temperature adjusted in consideration of running conditions of the railroad vehicle, and of a location on the railroad vehicle of the underfloor device, whose temperature is measured. With such configuration, temperature variation due to the location of the underfloor device and the running conditions (such as continuous running distance, weather, etc.) of the railroad vehicle can be adjusted; thus, an improved detection accuracy of temperature abnormality can be achieved.

In one embodiment of the present disclosure, the threshold values $A4$, $A5$, $A6$, $A7$, and $A8$ may be each selected in accordance with the temperatures of the underfloor device measured by the measurement devices. Such configuration allows more accurate determination of temperature abnormality. Specifically, in a case where an initial temperature of the underfloor device is low, the underfloor device will show a small temperature change; thus, determining the threshold values $A4$, $A5$, $A6$, $A7$, and $A8$ in temperature change based on the measured temperatures of the underfloor device allows an improved detection accuracy of temperature abnormality.

In one embodiment of the present disclosure, the processor may, upon obtaining a new measured temperature from one of the measurement devices, regard the previous second temperature $T2$ as a new first temperature $T1$, the previous third temperature $T3$ as a new second temperature $T2$, and the new measured temperature as a new third temperature T3, and may perform a new determination of temperature abnormality using the new first temperature T1, the new second temperature T2, and the new third temperature T3. Such configuration allows continuous monitoring of abnormality of the underfloor device for the railroad vehicle during running.

In one embodiment of the present disclosure, the processor may determine whether or not a temperature abnormality occurred if the new third temperature T3 is greater than the threshold value A3 in the new determination of temperature abnormality. Such configuration allows a further improved detection accuracy of temperature abnormality.

Another aspect of the present disclosure is a temperature abnormality detection method using, among temperatures of an underfloor device of a railroad vehicle at points on a ground through which the railroad vehicle runs sequentially, a first temperature T1, a second temperature T2 at a point which the railroad vehicle passes after a measurement point of the first temperature T1, and a third temperature T3 at a point which the railroad vehicle passes after a measurement point of the second temperature T2, and using threshold values A0, A1, A2, A3, A4, A5, A6, A7, and A8, which are specified previously, to thereby determine whether or not a temperature abnormality occurred when any one of following Conditions (A), (B), (C), (D), and (E) is satisfied:

(A) (T1>A0) or (T2>A0) or (T3>A0);
(B) (T1>A1) and ((T2−T1>A4) or (T2−T1<0)) and (T2>A2) and (T3>A3);
(C) (T1>A1) and (T2−T1>A4) and (T3>A3);
(D) (T1>A1) and (T2−T1>A4) and ((T3−T2>A5) or (T3−T1>A6)); and
(E) (T1>A1) and (T2−T1<0) and ((T3−T2>A7) or (T3−T1>A8)), where A1<A0, A2<A0, and A3<A0.

Such method allows detection of temperature abnormality of an underfloor device with high accuracy.

BRIEF DESCRIPTION OF THE DRAWINGS

Some embodiments of the present disclosure will be described hereinafter by way of example with reference to the accompanying drawings, in which.

DETAILED DESCRIPTION OF THE PREFERRED EMBODIMENTS

1. First Embodiment 1-1. Configuration

Figure 1:
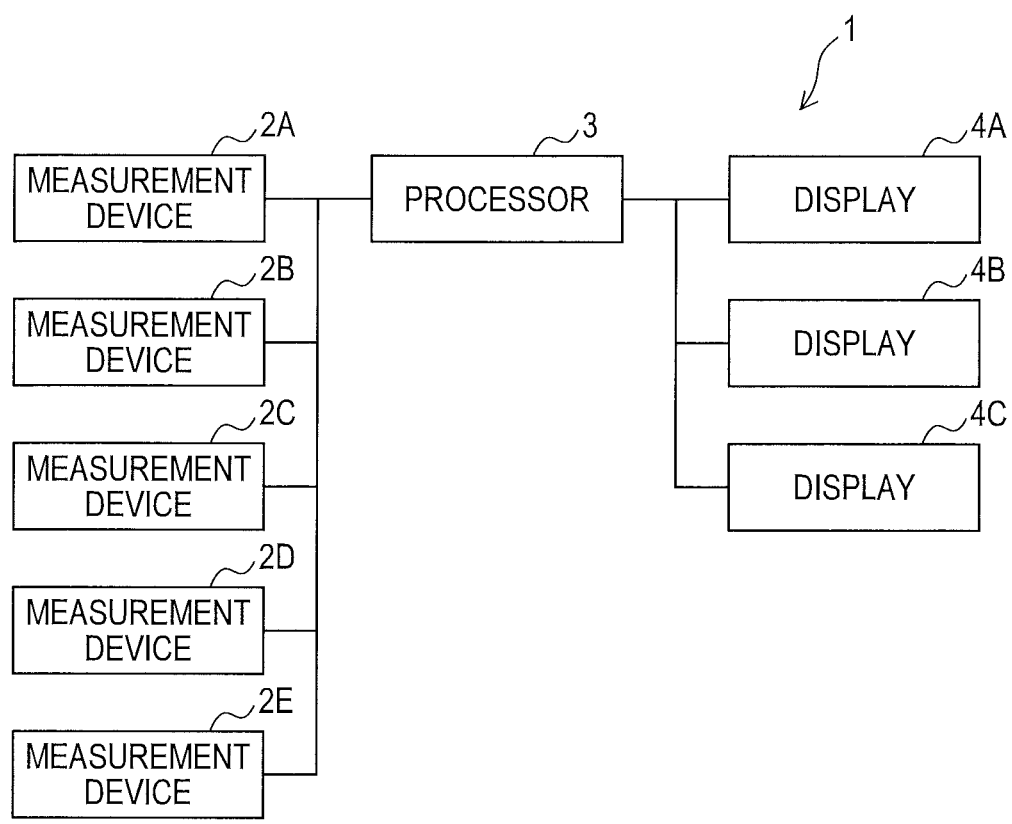
FIG. 1 is a block diagram schematically showing a configuration of a temperature abnormality detection system of an embodiment.

A temperature abnormality detection system 1 shown in FIG. 1 is a system for detecting temperature abnormality of an underfloor device of a railroad vehicle, for example, for the purpose of abnormality detection of a railroad truck. The temperature abnormality detection system 1 comprises measurement devices 2A, 2B, 2C, 2D, 2E; a processor 3; and displays 4A, 4B, 4C.

Measurement Device

The measurement devices 2A, 2B, 2C, 2D, 2E are positioned at respective measurement points on the ground through which a railroad vehicle runs sequentially, and measure temperatures of the railroad vehicle passing the respective measurement points. The measurement points are aligned along a running direction of the railroad vehicle.

Figure 2:
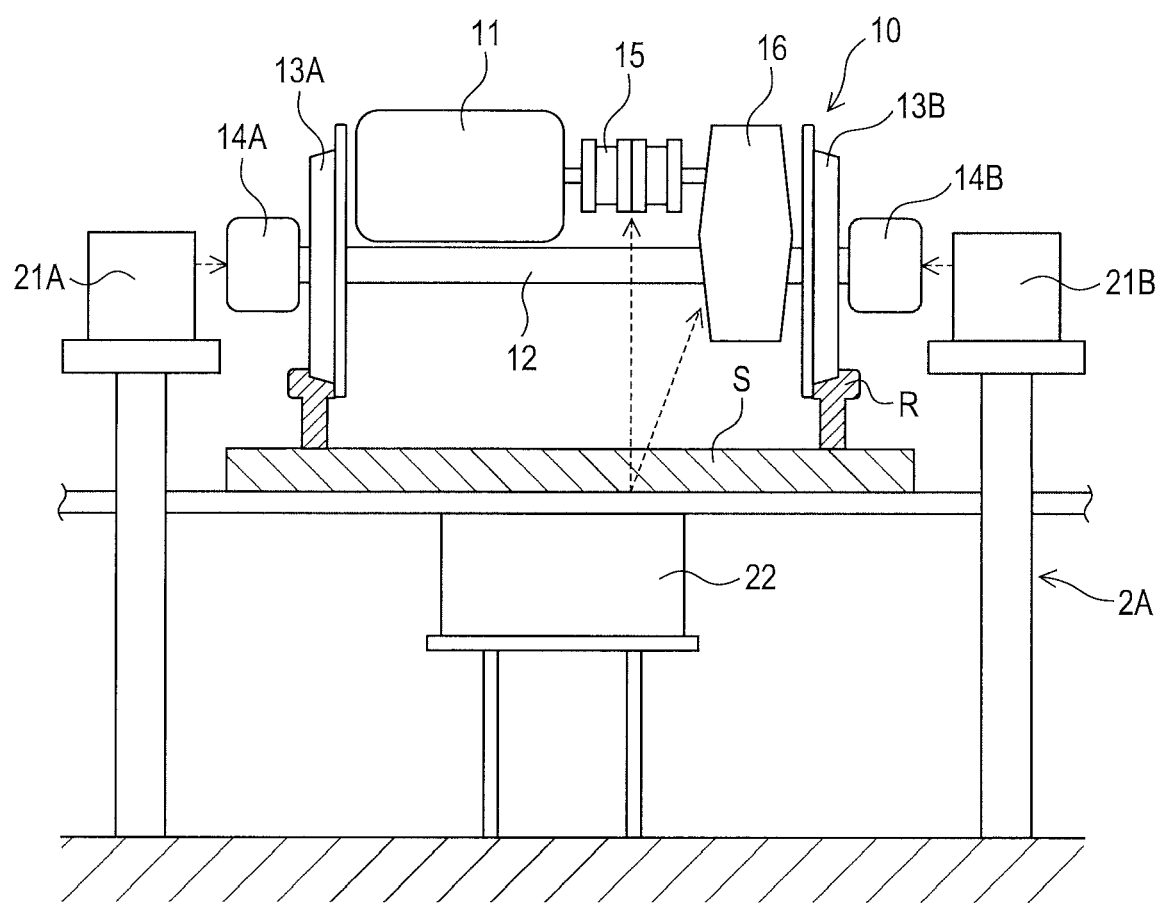
FIG. 2 is a schematic diagram of measurement devices in the temperature abnormality detection system of FIG. 1.

As shown in FIG. 2, a main electric motor 11, and devices of an axle system, including an axle 12 and two wheels 13A, 13B, are disposed under the floor of the railroad vehicle. Axle boxes 14A, 14B are arranged outside of the wheel 13A, 13B. A driving force of the main electric motor 11 is transmitted to the axle 12 through a coupling 15 and a gear box 16.

The axle boxes 14A, 14B each contain a bearing of the axle 12, a lubrication device, and others. The gear box 16 contains gears. The coupling 15 relays the driving force of the main electric motor 11 to the gears.

The axle boxes 14A, 14B, the coupling 15, and the gear box 16 are mounted to a railroad truck (not shown). If abnormality such as distortion occurs to the railroad truck, then rotational axes of the axle 12 and the main electric motor 11 are inclined, causing abnormal abrasion of the bearing, the coupling, the gears, and others. By monitoring temperatures of underfloor devices of the axle system, such as the axle boxes 14A, 14B, the coupling 15, and the gear box 16, abnormality of the railroad truck can be indirectly monitored.

In the first embodiment, the measurement devices 2A, 2B, 2C, 2D, 2E each have two upper thermometers 21A, 21B and a lower thermometer 22. An infrared thermometer may be used for each of the upper thermometers 21A, 21B and the lower thermometer 22.

The two upper thermometers 21A, 21B measure respective temperatures of the two axle boxes 14A, 14B. The two upper thermometers 21A, 21B are arranged such that the axle 12 is located therebetween, to measure the two axle boxes 14A, 14B from outside along a longitudinal direction of a sleeper (in other words, a direction perpendicular to a running direction of the railroad vehicle).

The lower thermometer 22 measures the temperatures of the coupling 15 and the gear box 16. The lower thermometer 22 is arranged below rails R and sleepers S, and measures the temperatures of the coupling 15 and the gear box 16 from below between the sleepers.

The measurement device 2A, 2B, 2C, 2D, 2E are preferably provided to a bridge for the purpose of facilitating provision to existing rails R. However, a space may be provided below the rails R and the sleepers S in a place other than a bridge, and the lower thermometer 22 may be arranged in the space.

In the first embodiment, the five measurement devices 2A, 2B, 2C, 2D, 2E are arranged respectively at first to fifth points P1, P2, P3, P4, P5 (see FIG. 3A) that are spaced apart from one another along the running direction of the railroad vehicle. These points need not be located at same intervals. In a case where distances between adjacent points are different, at least a part of threshold values used by a below-described processor 3 is appropriately adjusted in accordance with the distance, to thereby achieve an improved detection accuracy.

Since the railroad vehicle runs on predetermined rails, providing a measurement device not to the vehicle but to the ground can eliminate the need to install a measurement device on the vehicle. Also, a single measurement device provided on the ground allows measurement of multiple vehicles; thus, introduction costs of the system can be reduced.

Each measurement device is required to measure a temperature of at least one underfloor device of each vehicle, but is not necessarily required to measure temperatures of two or more underfloor devices of each vehicle. However, from the viewpoint of improvement in detection accuracy, it is preferable to measure temperatures of a plurality of underfloor devices provided to each vehicle.

The temperatures measured by the measurement devices 2A, 2B, 2C, 2D, 2E are transmitted to the processor 3, which is provided apart from the measurement devices 2A, 2B, 2C, 2D, 2E, using a wireless communication line, such as an LTE (Long Term Evolution).

Processor

The processor 3 performs a determination of temperature abnormality based, among the temperatures measured by the measurement devices 2A, 2B, 2C, 2D, 2E, on a first temperature $T1$, on a second temperature $T2$ at a point that the railroad vehicle passes after a measurement point of the first temperature $T1$, and on a third temperature $T3$ at a point that the railroad vehicle passes after the measurement point of the second temperature $T2$.

The processor 3 may be, for example, a server that comprises a CPU to perform computation and a storage to store data, and is connected to the same network as that of the measurement devices 2A, 2B, 2C, 2D, 2E.

The dispersion of the temperatures of an underfloor device may occur depending on running conditions of the railroad vehicle, including continuous running time, running pattern, and weather and temperature during running. For example, a maximum variation of 60 degrees in measured temperature may occur depending on a season when the railroad vehicle runs.

Also, the measured temperature of an underfloor device may vary depending on a mounting position of the underfloor device, which is a measurement target, onto the railroad vehicle. For example, an underfloor device provided to a lead vehicle tends to have a lower temperature than an underfloor device provided to any other vehicles.

Thus, due to the running conditions of the railroad vehicle or the position of the underfloor device as a measurement target, an erroneous detection of temperature abnormality may occur, or instead a detection failure of temperature abnormality may occur. To avoid this, the processor 3 specifies values of the first temperature $T1$, the second temperature $T2$, and the third temperature $T3$ by adjusting the temperatures measured by the measurement devices 2A, 2B, 2C, 2D, 2E, in consideration of the running conditions of the railroad vehicle, and the position of the underfloor device, whose temperature is measured, on the railroad vehicle.

Specifically, for example, a correlation of the measured temperature with the running conditions of the railroad vehicle and with the position of the underfloor is obtained by a known regression analysis based on a large amount of field data. A representative value (for example, an average value) of the measured temperature is adjusted using a coefficient, a function, or the like, based on the obtained correlation, to thereby obtain an adjusted first temperature $T1$, an adjusted second temperature $T2$, or an adjusted third temperature $T3$. In a case where an underfloor device having a small variation in measured temperature is a measurement target, the aforementioned adjustment may be omitted.

In the case of measuring temperatures of more than one underfloor devices (that is, the axle boxes 14A, 14B, the coupling 15, and the gear box 16) as in the first embodiment, the temperatures of the underfloor devices may be monitored by obtaining the first temperature $T1$, the second temperature $T2$, and the third temperature $T3$ for each of the underfloor devices.

Figure 3A:
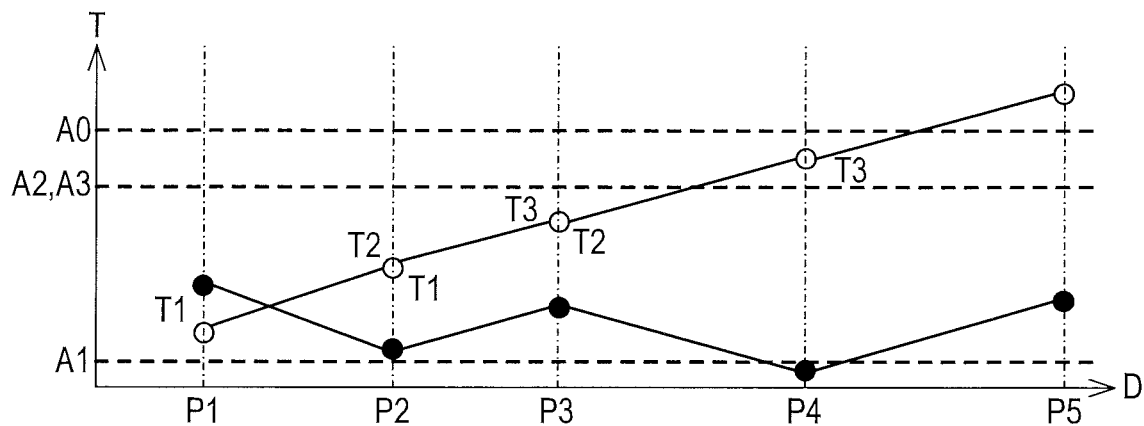
FIG. 3A is a graph showing one example of changes in measured temperatures at a plurality of measurement points.

In a case where a railroad vehicle is running between a point P3 and a point P4, as shown in FIG. 3A, the first temperature $T1$ is a measured temperature at the first point P1, the second temperature $T2$ is a measured temperature at the second point P2, and the third temperature $T3$ is a measured temperature at the third point P3.

In FIG. 3A, black dots show an example of a measurement pattern without abnormality, and white dots show an example of a measurement pattern with abnormality. In each of FIGS. 3A, 3B, and 3C, the horizontal axis represents a mileage D, and the vertical axis represents a temperature T.

When the processor 3 obtains, after performing a determination of temperature abnormality, a new measured temperature from any one of the measurement devices 2A, 2B, 2C, 2D, 2E, the processor 3 regards the previous second temperature $T2$ as a new first temperature $T1$, the previous third temperature $T3$ as a new second temperature $T2$, and the new measured temperature as a new third temperature $T3$, and then performs a new determination of temperature abnormality.

For example, in FIG. 3A, assume that, after the processor 3 performs a determination in a state where the first temperature $T1$ is a measured temperature at the first point P1, the second temperature $T2$ is a measured temperature at the second point P2, and the third temperature $T3$ is a measured temperature at the third point P3, the railroad vehicle passes the fourth point P4, and a measured temperature at the fourth point P4 is obtained. Then, the first temperature $T1$ is updated to the measured temperature at the second point P2, the second temperature $T2$ is updated to the measured temperature at the third point P3, and the third temperature $T3$ is updated to the measured temperature at the fourth point P4. The processor 3 performs another determination of temperature abnormality based on the updated first temperature $T1$, the updated second temperature $T2$, and the updated third temperature $T3$.

In a case where the railroad vehicle runs back and forth on the same rails, the first temperature $T1$, the second temperature $T2$, and the third temperature $T3$ may include temperatures measured at a same point. For example, if the railroad vehicle that has passed the fifth point P5 runs back on the same rails, a determination is performed in a state where the first temperature $T1$ is a measured temperature at the first time at the fourth point P4, the second temperature $T2$ is a measured temperature at the fifth point P5, and the third temperature $T3$ is a measured temperature at the second time at the fourth point P4.

The processor 3 uses a plurality of threshold values A0, A1, A2, A3, A4, A5, A6, A7, A8 previously specified, and determines that there is a temperature abnormality if any one of following Conditions (A), (B), (C), (D), and (E) is satisfied:

(A) ($T1$>$A0$) or ($T2$>$A0$) or ($T3$>$A0$);

(B) (T1>A1) and ((T2−T1>A4) or (T2−T1<0)) and (T2>A2) and (T3>A3);

(C) (T1>A1) and (T2−T1>A4) and (T3>A3);

(D) (T1>A1) and (T2−T1>A4) and ((T3−T2>A5) or (T3−T1>A6)); and (E) (T1>A1) and (T2−T1<0) and ((T3−T2>A7) or (T3−T1>A8)), where A1<A0, A2<A0, and A3<A0.

Condition (A) is intended to determine occurrence of abnormality in a case where at least one of the first temperature T1, the second temperature T2, or the third temperature T3 exceeds a previously specified temperature (i.e., an absolute threshold value A0). The absolute threshold value A0 is, for example, 1K (Kelvin) or greater and 100 K or less.

If the first temperature T1, when obtained, exceeds the absolute threshold value A0, then occurrence of abnormality may be determined without waiting for obtainment of the second temperature T2 and the third temperature T3. Also, if the second temperature T2, when obtained, exceeds the absolute threshold value A0, then occurrence of abnormality may be determined without waiting for obtainment of the third temperature T3.

Figure 3B:
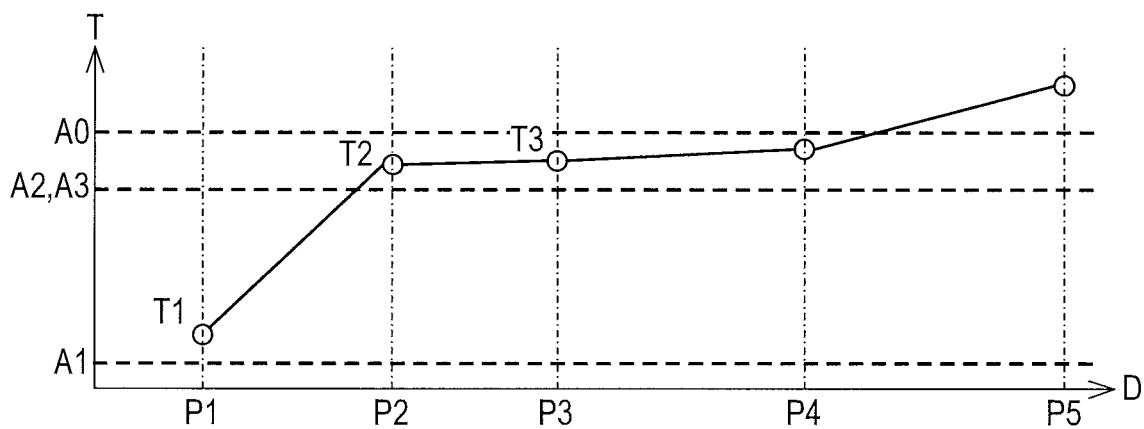
FIG. 3B is a graph showing one example of changes in measured temperatures at a plurality of measurement points, which are different from those in FIG. 3A.

Condition (B) is intended to determine occurrence of abnormality, for example, in a case where, as shown in FIG. 3B, the first temperature T1 measured at the first point P1 exceeds the first threshold value A1, a difference between the second temperature T2 measured at the second point P2 and the first temperature T1 exceeds a fourth threshold value A4, the second temperature T2 exceeds the second threshold value A2, which is smaller than the absolute threshold value A0, and the third temperature T3 measured at the third point P3 exceeds the third threshold value A3, which is also smaller than the absolute threshold value A0.

Herein, the first threshold value A1 is an index value for determining whether to determine occurrence of abnormality. Thus, the first threshold value A1 is sufficiently smaller than either the second threshold value A2 or the third threshold value A3, and is, for example, 1% or greater and 99% or less of the absolute threshold value A0. The second threshold value A2 and the third threshold value A3 are each, for example, 1% or greater and 99% or less of the absolute threshold value A0. The second threshold value A2 and the third threshold value A3 may be a same value or different values. The fourth threshold value A4 is a positive value and is, for example, 1K or greater and 100 K or less.

According to Condition (B), the processor 3 can determine occurrence of abnormality in a case where the temperatures at least two points continue to be close to the absolute threshold value A0 even if none of the temperatures at the three points exceeds the absolute threshold value A0. Thus, abnormality can be detected even when temperature changes between adjacent points are slight as shown in FIG. 3B.

According to Condition (B), occurrence of abnormality can be determined also in a case where the difference between the second temperature T2 and the first temperature T1 does not exceed the fourth threshold value A4, and instead is a negative value as well as satisfies the rest of Conditions above, that is, in a case where the first temperature T1 is assumed to be greater than the first threshold value A1 by a certain amount. That is, according to Condition (B), occurrence of abnormality can be determined in a case where the first temperature T1, the second temperature T2, and the third temperature T3 are equal to or greater than respective specified values.

Condition (C) is intended to determine occurrence of abnormality, for example, in a case where, as shown in FIG. 3A, the first temperature T1 measured at the second point P2 exceeds the first threshold value A1, a difference between the second temperature T2 measured at the third point P3 and the first temperature T1 exceeds the fourth threshold value A4, and also the third temperature T3 measured at the fourth point P4 exceeds the third threshold value A3.

According to Condition (C), the processor 3 can determine occurrence of abnormality in a case where, although the temperatures do not exceed the absolute threshold value A0, a specified temperature increase between two points is observed, and thereafter a temperature close to the absolute threshold value A0 is reached.

Figure 3C:
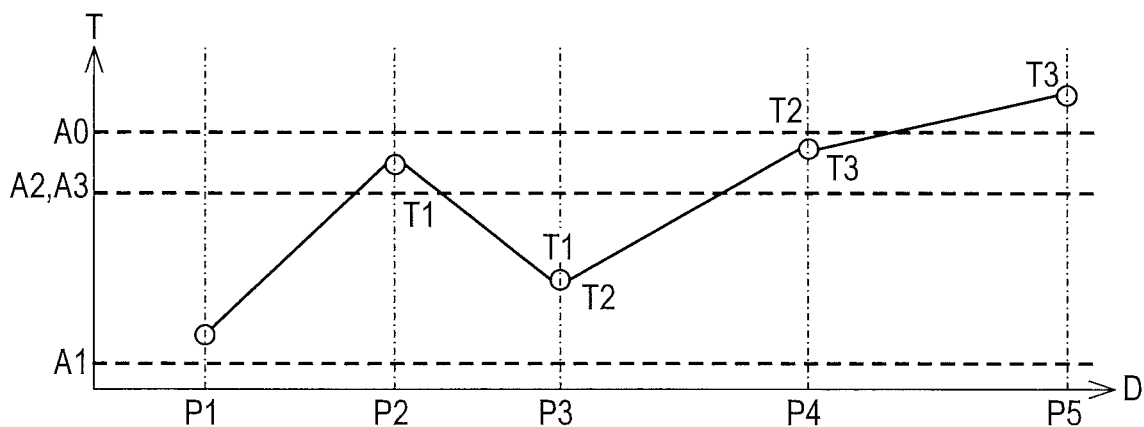
FIG. 3C is a graph showing one example of changes in measured temperatures at a plurality of measurement points, which are different from those in FIG. 3A and FIG. 3B.

Condition (D) is intended to determine occurrence of abnormality, for example, in a case where, as shown in FIG. 3C, the first temperature T1 measured at the third point P3 exceeds the first threshold value A1, a difference between the second temperature T2 measured at the fourth point P4 and the first temperature T1 exceeds the fourth threshold value A4, and a difference between the third temperature T3 measured at the fifth point P5 and the second temperature T2 exceeds a fifth threshold value A5. The fifth threshold value A5 is a positive value and is, for example, 1K or greater and 100 K or less.

Also, Condition (D) includes a case where the first temperature T1 exceeds the first threshold value A1 as an index value, a difference between the second temperature T2 and the first temperature T1 exceeds the fourth threshold value A4, and a difference between the third temperature T3 and the first temperature T1 exceeds a sixth threshold value A6. The sixth threshold value A6 is a positive value and is, for example, 1K or greater and 100 K or less.

Condition (E) is intended to determine occurrence of abnormality, for example, in a case where, as shown in FIG. 3C, the first temperature T1 measured at the second point P2 exceeds the first threshold value A1, a difference between the second temperature T2 measured at the third point P3 and the first temperature T1 is a negative value, and a difference between the third temperature T3 measured at the fourth point P4 and the second temperature T2 exceeds a seventh threshold value A7. The seventh threshold value A7 is a value greater than the fifth threshold value A5. The seventh threshold value A7 is, for example, 1K or greater and 100 K or less.

Also, Condition (E) includes a case where the first temperature T1 exceeds the first threshold value A1 as an index value, a difference between the second temperature T2 and the first temperature T1 is a negative value, and a difference between the third temperature T3 and the first temperature T1 exceeds a eighth threshold value A8. The eighth threshold value A8 is a value greater than the sixth threshold value A6. The eighth threshold value A8 is, for example, 1K or greater and 100 K or less.

Accordingly, according to Conditions (D) and (E), the processor 3 can determine occurrence of abnormality in a case where although the temperatures do not exceed the absolute threshold value A0, a temperature increase from the second temperature T2 to the third temperature T3 is equal to or greater than a specified amount, or a temperature increase from the first temperature T1 to the third temperature T3 is equal to or greater than a specified amount.

Further, the processor 3 may determine occurrence of temperature abnormality in a case where a new (that is, an updated) third temperature T3 is greater than the third threshold value A3 when performing another determination. This enables a further improved detection accuracy of temperature abnormality.

The fourth threshold value A4, the fifth threshold value A5, the sixth threshold value A6, the seventh threshold value A7, and the eighth threshold value A8 used in aforementioned Conditions are selected depending on the temperatures of the underfloor device measured by the measurement devices 2A, 2B, 2C, 2D, 2E.

For example, each of the fourth threshold value A4, the fifth threshold value A5, the sixth threshold value A6, the seventh threshold value A7, and the eighth threshold value A8 may be a function or a table in which a value is selected depending on a reference temperature of the underfloor device measured at a given point. The reference temperature may be one of the first temperature T1, the second temperature T2, and the third temperature T3, or may be another measured temperature.

When the temperature of the underfloor device is low, a temperature increase value will be small. Thus, the fourth threshold value A4, the fifth threshold value A5, the sixth threshold value A6, the seventh threshold value A7, and the eighth threshold value A8 may preferably be a function that decreases linearly in accordance with the reference temperature. That is, each of the threshold values is preferably a linear function of the reference temperature.

Also, the fourth threshold value A4, the fifth threshold value A5, the sixth threshold value A6, the seventh threshold value A7, and the eighth threshold value A8 may be specified for each range of the reference temperature. For example, the threshold values may be fixed values in a case where the reference temperature is equal to or greater than a specific value, and the threshold values may be infinite in a case where the reference temperature is less than the specific value.

The function or table of the fourth threshold value A4, the fifth threshold value A5, the sixth threshold value A6, the seventh threshold value A7, and the eighth threshold value A8 may be updated appropriately at each time point when a certain amount of measurement data has been stored.

Once the processor 3 has determined occurrence of abnormality, the processor 3 causes the displays 4A, 4B, 4C to indicate abnormality. The processor 3 may have a threshold value for warning other than the threshold values for abnormality determination. In this case, the processor 3 may cause the displays 4A, 4B, 4C to indicate a warning if, for example, a value of the first temperature T1 exceeds the threshold value for warning.

Display

The displays 4A, 4B, 4C indicate respective determination results by the processor 3. The displays 4A, 4B, 4C are arranged at different monitoring points and connected to the processor 3 through a network. The temperature abnormality detection system 1 may comprise only a single display.

1-2. Process

Figure 4:
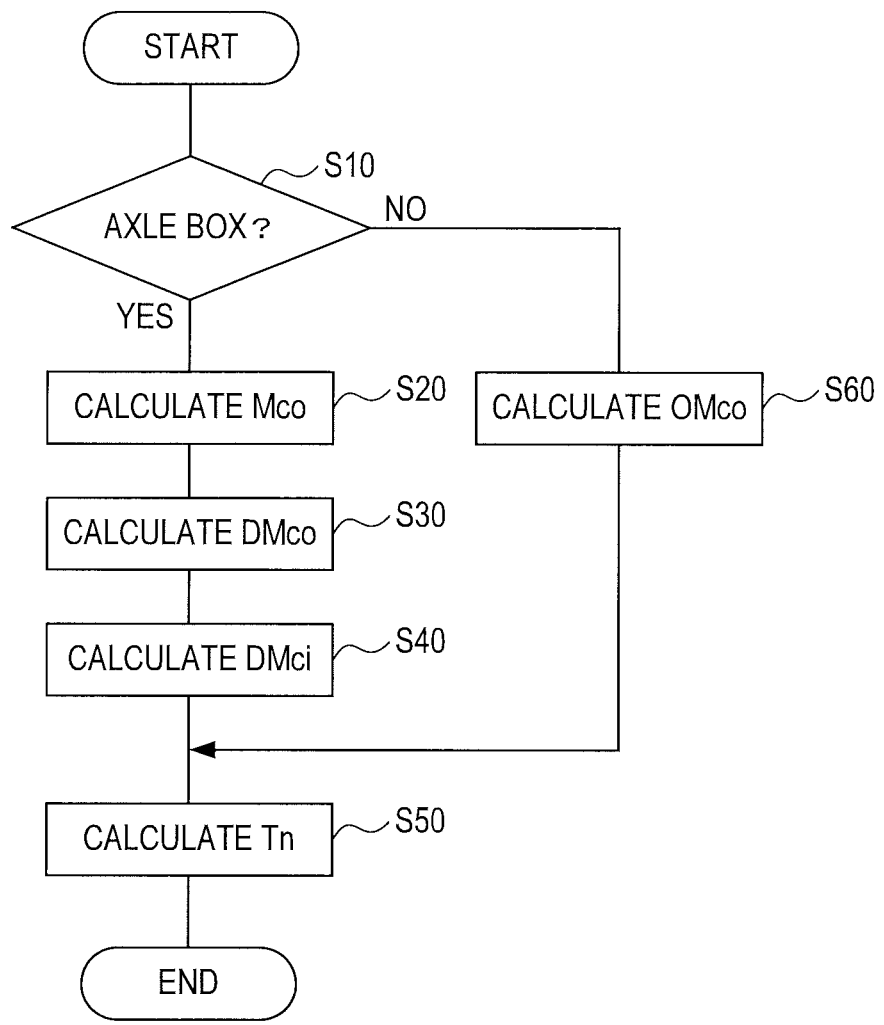
FIG. 4 is a flowchart schematically showing an adjustment process to be executed by a processor of FIG. 1.

Hereinafter, a description will be given of one example of an adjustment process executed by the processor 3 with reference to a flowchart of FIG. 4.

First, the processor 3 determines whether target devices of temperature measurement are axle boxes (Step S10). If the target devices are axle boxes (S10: YES), then the processor 3 obtains an average value (hereinafter referred to as the "first average value") Mco of measured temperatures of a plurality of target devices (i.e., axle boxes) for each vehicle (Step S20).

Next, the processor 3 calculates, for each axle system of vehicles, a deviation value DMco of the measured temperature of the target device from the first average value Mco (Step S30). Then, the deviation values DMco are grouped into data groups based on the position of the axle system on each of the vehicles, and the processor 3 obtains an average value (hereinafter referred to as the "second average value") DMci of the deviation values DMco of each of the data groups (Step S40).

In Step S40, the second average value DMci of each of data groups, which are grouped based on the position of the axle system, is obtained for each of a group of odd-numbered vehicles and a group of even-numbered vehicles in the order from the lead vehicle. For the lead vehicle, the second average value DMci is obtained by subtracting an average value of the deviation values DMco of its front railroad truck in the running direction from an average value of the deviation values DMco of its rear railroad truck.

Lastly, the processor 3 obtains the first temperature T1, the second temperature T2, or the third temperature T3 by Formula (1) below (Step S50). In Formula (1), Tn represents T1, T2, or T3; T0 represents the measured temperature of the target device, C1 represents a gradient of a regression line obtained from a relationship between the second average value DMci and the first average value Mco, and C2 represents a segment of the regression line.

$$Tn = T0 - Mco - (Dmci \times C1 + C2) \quad (1)$$

In a case where the target devices are unnecessary devices other than the axle boxes (S10: NO), the processor 3 obtains an average value (hereinafter referred to as the "third average value") OMco of measured temperatures of the target devices for the entire train of railroad vehicles (Step S60). Then, the processor 3 obtains the first temperature T1, the second temperature T2, or the third temperature T3 in Step S50 above by Formula (2) below.

$$Tn = T0 - OMco - C2 \quad (2)$$

Figure 5:
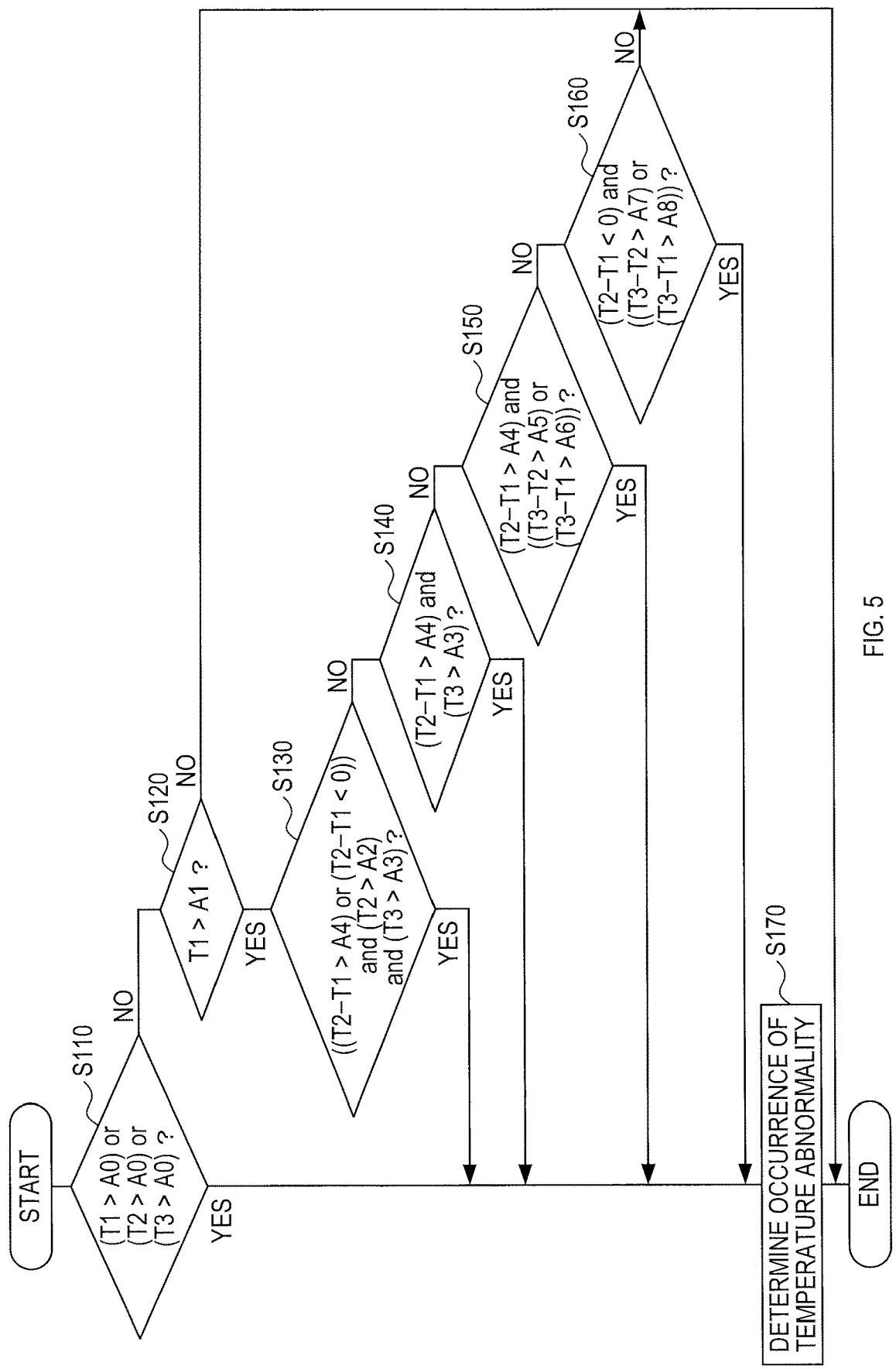
FIG. 5 is a flowchart schematically showing a determination process to be executed by the processor of FIG. 1.

Next, a description will be given of a determination process executed by the processor 3 with reference to a flowchart of FIG. 5.

The processor 3 first determines whether Condition (A) is satisfied (that is, whether (T1>A0) or (T2>A0) or (T3>A0)) (Step S110). If Condition (A) is satisfied (S110: YES), then the processor 3 determines that there is a temperature abnormality (Step S170).

If Condition (A) is not satisfied (S110: NO), then the processor 3 determines whether T1>A1 (Step S120). If T1 is A1 or less (S120: NO), then none of Conditions (B), (C), (D) and (E) is satisfied; thus, the processor 3 determines that there is no temperature abnormality, and terminates the process.

If T1>A1 in Step S120 (S120: YES), then the processor 3 next determines whether ((T2−T1>A4) or (T2−T1<0)) and (T2>A2) and (T3>A3) (Step S130). If ((T2−T1>A4) or (T2−T1<0)) and (T2>A2) and (T3>A3) (S130: YES), then Condition (B) is satisfied; thus, the processor 3 determines that there is a temperature abnormality (Step S170).

If T2−T1 is 0 or greater and A4 or less, T2 is A2 or less, or T3 is A3 or less in Step S130 (S130: NO), then the processor 3 determines whether (T2−T1>A4) and (T3>A3) (Step S140). If (T2−T1>A4) and (T3>A3) (S140: YES), then Condition (C) is satisfied; thus the processor 3 determines that there is a temperature abnormality (Step S170).

If T2−T1 is A4 or less, or T3 is A3 or less in Step S140 (S140: NO), then the processor 3 determines whether (T2−T1>A4) and ((T3−T2>A5) or (T3−T1>A6)) (Step S150). If (T2−T1>A4) and ((T3−T2>A5) or (T3−T1>A6)) (S150: YES), then Condition (D) is satisfied; thus the processor 3 determines that there is a temperature abnormality (Step S170).

If T2−T1 is A4 or less, or T3−T2 is A5 or less and T3−T1 is A6 or less in Step S150 (S150: NO), then the processor 3 determines whether (T2−T1<0) and ((T3−T2>A7) or (T3−T1>A8)) (Step S160). If (T2−T1<0) and ((T3−T2>A7) or (T3−T1>A8)) (S160: YES), then Condition (E) is satisfied; thus, the processor 3 determines that there is a temperature abnormality (Step S170).

If T2−T1 is 0 or greater, or T3−T2 is A7 or less and T3−T1 is A8 or less in Step S160 (S160: NO), then none of Conditions (A), (B), (C), (D), and (E) is satisfied; thus, the processor 3 determines that there is no temperature abnormality and terminates the process.

Step S130 to Step S160 may be interchangeable in the order of determination. For example, after it is determined "YES" in Step S120, the determination in Step S150 may be performed prior to Step S130 and Step S140.

1-3. Effects

According to the above-detailed first embodiment, the following effects can be obtained:

(1a) The abnormality determination is performed using Conditions (B), (C), (D), and (E) in addition to using conventional Condition (A); thus, relatively rapid detection of temperature abnormality can be achieved while reducing incorrect detection. That is, temperature abnormality of underfloor devices can be detected with high accuracy.

(1b) Temperatures to be used as the first temperature T1, the second temperature T2, and the third temperature T3 are adjusted in consideration of the running conditions (such as continuous running distance, weather, etc.) of the railroad vehicle and of the location on the railroad vehicle of the underfloor device, whose temperature is measured; thus, temperature changes due to the location of the underfloor device and the running conditions of the railroad vehicle can be adjusted. Accordingly, an improved detection accuracy of temperature abnormality can be achieved.

(1c) The threshold values A4, A5, A6, A7, A8 are selected in accordance with the temperatures of the underfloor device, which are measured by the measurement devices 2A, 2B, 2C, 2D, 2E; thus, an improved accuracy of temperature abnormality determination can be achieved.

(1d) Upon obtaining a new measured temperature from the measurement devices 2A, 2B, 2C, 2D, 2E, the processor 3 updates the first temperature T1, the second temperature T2, and the third temperature T3, and then performs another temperature abnormality determination; thus, continuous monitoring of abnormality of the underfloor device can be achieved for the railroad vehicle during running.

2. Second Embodiment

2-1. Configuration

A temperature abnormality detection method of the present disclosure is a method for detecting temperature abnormality of an underfloor device of a railroad vehicle using the temperature abnormality detection system 1 of FIG. 1.

For the railroad vehicle as a detection target, the temperature abnormality detection method repeatedly performs i) temperature measurement of the underfloor device of the railroad vehicle at points on the ground through which the railroad vehicle runs sequentially, and ii) calculation of whether any of Conditions (A), (B), (C), (D), and (E) is satisfied.

Instead of using the temperature abnormality detection system 1 of FIG. 1, the temperature abnormality detection method may manually determine whether any of Conditions (A), (B), (C), (D), and (E) is satisfied, and determine temperature abnormality.

2-2. Effects

According to the above-detailed second embodiment, the following effects can be obtained:

(2a) Temperature abnormality of an underfloor device can be detected with high accuracy by using Conditions (A), (B), (C), (D), and (E).

3. Other Embodiments

Although some embodiments of the present disclosure have been described above, it is to be understood that the present disclosure is not limited to the aforementioned embodiments, but may be implemented in various forms.

(3a) In the temperature abnormality detection system 1 of the aforementioned embodiments, the threshold values A4, A5, A6, A7, A8 are not necessarily required to be selected in accordance with the temperatures of the underfloor device, but may be predetermined fixed values.

(3b) In the temperature abnormality detection system 1 of the aforementioned embodiments, the processor 3 may perform temperature abnormality determination further using another measured temperature at at least one point which the railroad vehicle passes after the measurement point of the third temperature T3, in addition to the first temperature T1, the second temperature T2, and the third temperature T3.

(3c) A function performed by a single element in the aforementioned embodiments may be achieved by a plurality of elements, or a function performed by a plurality of elements may be achieved by a single element. Also, a part of a configuration in the aforementioned embodiments may be omitted. Further, at least a part of a configuration in one of the aforementioned embodiments may be added to, or may replace, a configuration in another one of the aforementioned embodiments. Any form included in the technical idea defined by the language of the appended claims may be an embodiment of the present disclosure.

What is claimed is:

1. A temperature abnormality detection system comprising:
   measurement devices, each measuring device being positioned at a corresponding one of a plurality of measurement points on a ground through which a railroad vehicle runs sequentially and being configured to measure a temperature of an underfloor device of the railroad vehicle that passes the corresponding measurement point; and
   a processor configured to perform a determination of a temperature abnormality based on a first temperature T1 at a first of the plurality of measurement points, a second temperature T2 at a second of the plurality of measurement points which the railroad vehicle passes after the first measurement point of the first temperature T1, and a third temperature T3 at a third of the plurality of measurement points which the railroad vehicle passes after the second measurement point of the second temperature T2, among the temperatures measured by the measurement devices,
wherein the processor is configured to perform the determination of abnormality by:
using threshold values A0, A1, A2, A3, A4, A5, A6, A7, and A8, which are specified previously;
determining whether Conditions (A), (B), (C), (D), and (E) are satisfied:
(A) (T1>A0) or (T2>A0) or (T3>A0);
(B) (T1>A1) and ((T2−T1>A4) or (T2−T1<0)) and (T2>A2) and (T3>A3);
(C) (T1>A1) and (T2−T1>A4) and (T3>A3);
(D) (T1>A1) and (T2−T1>A4) and ((T3−T2>A5) or (T3−T1>A6)); and
(E) (T1>A1) and (T2−T1<0) and ((T3−T2>A7) or (T3−T1>A8)),
where A1<A0, A2<A0, and A3<A0;
determining that a temperature abnormality occurred in response to any one of Conditions (A), (B), (C), (D), and (E) being satisfied; and
causing at least one display to indicate a warning in response to the determined temperature abnormality.

2. The temperature abnormality detection system according to claim 1,
wherein each of the first temperature T1, the second temperature T2, and the third temperature T3 is a temperature adjusted in consideration of running conditions of the railroad vehicle, and of a location on the railroad vehicle of the underfloor device, whose temperature is measured.

3. The temperature abnormality detection system according to claim 1,
wherein the threshold values A4, A5, A6, A7, and A8 are each selected in accordance with the temperatures of the underfloor device measured by the measurement devices.

4. A temperature abnormality detection system comprising:
measurement devices, each measuring device being positioned at a corresponding one of a plurality of measurement points on a ground through which a railroad vehicle runs sequentially and being configured to measure a temperature of an underfloor device of the railroad vehicle that passes the corresponding measurement point; and
a processor configured to perform a determination of a temperature abnormality based on a first temperature T1 at a first of the plurality of measurement points, a second temperature T2 at a second of the plurality of measurement points which the railroad vehicle passes after the first measurement point of the first temperature T1, and a third temperature T3 at a third of the plurality of measurement points which the railroad vehicle passes after the second measurement point of the second temperature T2, among the temperatures measured by the measurement devices,
wherein the processor is configured to perform the determination of abnormality by:
using threshold values A0, A1, A2, A3, A4, A5, A6, A7, and A8, which are specified previously;
determining whether conditions (A), (B), (C), (D), and (E) are satisfied:
(A) (T1>A0) or (T2>A0) or (T3>A0);
(B) (T1>A1) and ((T2−T1>A4) or (T2−T1<0)) and (T2>A2) and (T3>A3);
(C) (T1>A1) and (T2−T1>A4) and (T3>A3);
(D) (T1>A1) and (T2−T1>A4) and ((T3−T2>A5) or (T3−T1>A6)); and
(E) (T1>A1) and (T2−T1<0) and ((T3−T2>A7) or (T3−T1>A8)),
where A1<A0, A2<A0, and A3<A0; and
determining that a temperature abnormality occurred in response to any one of Conditions (A), (B), (C), (D), and (E) being satisfied; and
causing at least one display to indicate a warning in response to the determined temperature abnormality,
wherein, upon obtaining a new measured temperature from one of the plurality of measurement devices, the processor regards the previous second temperature T2 as a new first temperature T1, the previous third temperature T3 as a new second temperature T2, and the new measured temperature as a new third temperature T3, and performs a new determination of temperature abnormality using the conditions (A), (B), (C), (D) and (E) and the new first temperature T1, the new second temperature T2, and the new third temperature T3.

5. The temperature abnormality detection system according to claim 4,
wherein the processor determines whether a temperature abnormality occurred if the new third temperature T3 is greater than the threshold value A3 in the new determination of temperature abnormality.

6. A temperature abnormality detection method comprising:
measuring with measurement devices temperatures of an underfloor device of a railroad vehicle at a plurality of measurement points on a ground through which the railroad vehicle runs sequentially, including a first temperature T1 at a first of the plurality of measurement points, a second temperature T2 at a second of the plurality of measurement points which the railroad vehicle passes after the first measurement point of the first temperature T1, and a third temperature T3 at a third of the plurality of measurement points which the railroad vehicle passes after the second measurement point of the second temperature T2
determining with a processor whether a temperature abnormality of the underfloor device occurred by:
using threshold values A0, A1, A2, A3, A4, A5, A6, A7, and A8, which are specified previously;
determining whether
Conditions (A), (B), (C), (D), and (E) are satisfied:
(A) (T1>A0) or (T2>A0) or (T3>A0);
(B) (T1>A1) and ((T2−T1>A4) or (T2−T1<0)) and (T2>A2) and (T3>A3);
(C) (T1>A1) and (T2−T1>A4) and (T3>A3);
(D) (T1>A1) and (T2−T1>A4) and ((T3−T2>A5) or (T3−T1>A6)); and
(E) (T1>A1) and (T2−T1<0) and ((T3−T2>A7) or (T3−T1>A8)),
where A1<A0, A2<A0, and A3<A0;
determining that a temperature abnormality occurred in response to any one of following Conditions (A), (B), (C), (D), and (E) being satisfied; and
causing at least one display to indicate a warning in response to the determined temperature abnormality.

* * * * *